Jan. 8, 1935.  A. FRIEDEN  1,986,887
RECEPTACLE FOR LIQUID MATERIAL
Filed Nov. 12, 1931
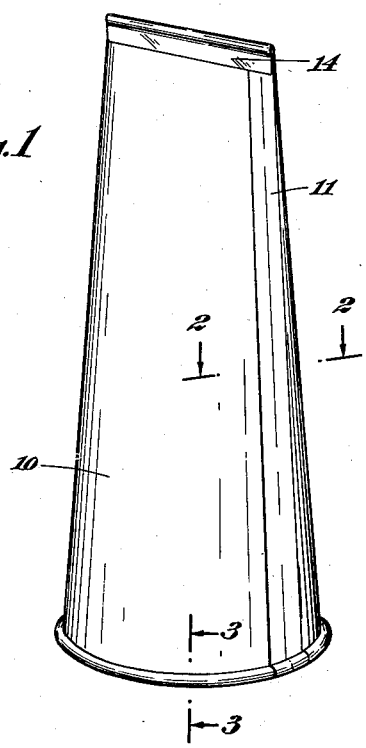
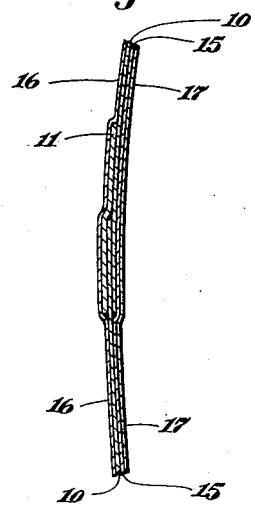
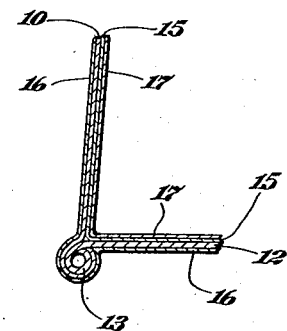
INVENTOR
Alexander Frieden,
BY
Frederick Breitenfeld
ATTORNEY Patented Jan. 8, 1935

1,986,887

UNITED STATES PATENT OFFICE 1,986,887

RECEPTACLE FOR LIQUID MATERIAL

Alexander Frieden, New Rochelle, N. Y.

Application November 12, 1931, Serial No. 574,596

3 Claims. (Cl. 229—3.1)

My present invention relates generally to receptacles or containers, and has particular reference to paper receptacles.

Although I have herein illustrated and shall hereinafter describe my invention in connection with a frusto-conical container, nevertheless it will be understood that certain phases of my invention are not restricted to a container or receptacle of such particular shape.

It is a general object of my invention to provide an improved type of container adapted to accommodate liquid materials, and composed of sheet material of the character of paper. The term "paper", however, where the same is used herein and in the appended claims, is intended to be used in its generic sense and to include cardboard and its equivalents.

One type of container to which my invention is applicable is the type which has found favor of late in connection with the packaging and marketing of milk or the like. It is usually composed of sheet material rolled, shaped, and assembled into a substantially cup-shaped body of frusto-conical configuration, the upper or open end of the body being sealed by means of a closure strip of one sort or another, this sealed end being adapted to be opened when the contents of the container are to be made accessible. The container is generally impregnated with wax or coated on its surfaces with wax, usually in molten form.

Containers of this general character have proven substantially satisfactory in commercial use, where they are used to accommodate milk or the like, for the reason that milk is substantially neutral in chemical characteristics, and for the further reason that the milk cannot feasibly be left to stand in the containers for any appreciable length of time. Such containers are unsatisfactory, however, where the liquid to be accommodated is either acid or alkaline, or where it is to be accommodated for any appreciable length of time.

It is a general object of my present invention to provide an improved container of this type, and, more particularly, to render the same more staunch and permanent, and more liquid-tight. A container constructed in accordance with my present invention is adapted satisfactorily to accommodate liquids for longer periods of time, and is more resistant to the normal wear and tear to which such containers are likely to be subjected.

A further object of my invention is to provide an improved container which is suitable for the transportation and packaging of acid or alkaline liquids, such as tomato juice, acidophilus milk, milk of magnesia, or the like. Such liquids have a peculiar ability to penetrate into and through paper or the like, even where the same is coated with wax, and a feature of my present invention lies in providing a container which is impervious to the penetrative action of practically all types of liquids.

In accordance with my invention, I provide for the walls of the receptacle a coating or layer which is simple and inexpensive to produce, utterly harmless, capable of completely resisting any penetration whatsoever, tenacious and tough, unreactive toward paper or wax, and capable of being used in conjunction with the usual wax or paraffin coating.

I have found that rubber latex is admirably suited for my present purposes, and I mean to include within this term the material which is known on the market as "vulcanized latex".

I achieve the foregoing objects and advantages, and such other objects and advantages as may hereinafter appear or be pointed out, in the manner illustratively exemplified in the accompanying drawing, wherein—

Figure 1 is a perspective view of one type of receptacle of the general character to which my invention relates;

Figure 2 is an enlarged, fragmentary, cross-sectional view taken substantially along the line 2—2 of Figure 1; and Figure 3 is an enlarged, fragmentary, cross-sectional view taken substantially along the line 3—3 of Figure 1.

The container I have illustrated by way of example is composed of a substantially tubular body portion 10 which is formed from a suitably shaped blank of paper sheet material rolled upon itself so that its opposite lateral edges are brought into overlapping relationship, as indicated most clearly in Figure 2. Usually, though not necessarily, the overlapping edges are secured in overlapped relationship by means of an adhesive strip or sticker 11.

One end of the tubular body, usually and preferably the larger end, is sealed by means of a closure disc 12 whose marginal portion is spun or rolled into engagement with the edge of the body 10, as indicated most clearly in Figure 3. Preferably, the closure disc 12 is a separate blank of paper sheet material, substantially circular, and provided with a peripheral flange or skirt 13, this flange or skirt being rolled into a bead-like assembly with the lower edge of the body 10.

After the container is completely constructed and filled with the liquid to be carried, a sealing or closure strip 14 of any suitable character is applied to the upper edges in the manner illustratively shown in Figure 1.

In accordance with my present invention, the cup-shaped body is first formed in any suitable or desired manner, and rubber latex is then applied to the inside surfaces of the walls of the body, the term "walls" being intended to include the bottom wall. While this material may be sprayed, brushed, or applied in any other desired manner, I prefer to pour a quantity of it into the cup-shaped body and to roll the body around to cause the latex to cover every portion of the inner surfaces. Upon permitting it to dry, a continuous and unbroken layer 15 of rubber or caoutchouc is produced, this coating serving as a complete and continuous lining for the receptacle and being not only waterproof and liquid-tight, but also totally impervious to the action of such acids or alkalines as are generally encountered in liquids of the character hereinbefore illustratively specified.

The construction is completed by coating the walls, both inside and outside, with a layer of wax. This is preferably accomplished by submerging the entire container into a bath of molten paraffin or the like and thereupon permitting it to harden. This produces an outer coating 16 and an inner coating 17, and it is to be noted that the rubber or caoutchouc coating or layer is thereby sandwiched between the material of the receptacle and the inside wax coating 17.

The use of the molten wax is advantageous for the reason that its heat automatically has a sterilizing action, and for the added reason that the completed container has an attractive appearance and feel which appeals to the general public. The rubber coating is of a character which permits the wax to be employed in the manner outlined. I have found that it is unreactive toward the wax; it is not affected by the heat of the wax treatment; and it does not in the least repel the wax nor keep the latter from adhering in the contemplated manner.

The completed structure, in addition to being useful in the transportation of liquids of an alkaline or acid character, is more staunch and more liquid-tight than the ordinary type of receptacle. While normal wear and tear might conceivably produce cracks or fissures in the outer wax layer or layers, the liquid-tightness of the container is not affected for the reason that the inner rubber coating is inherently flexible and tenacious. I have found that the staunchness and liquid-tightness of the container is unaffected, even after liquids have been accommodated for substantial periods of time. Furthermore, the latex layer is thin, whereby the weight of the finished container is not appreciably increased; and since it is utterly harmless and unreactive toward wax, paper, or the foods or liquids to be packaged, its use is not only commercially feasible but highly advantageous.

Obviously, the rubber layer may be vulcanized after it is applied, or, as stated, so-called "vulcanized latex" may be employed at the outset.

It will also be understood that the latex coating may be applied to the outside of the container as well as to the inside, if desired, underneath the outer wax coating; and it may be applied to the walls of the container either before or after they are rolled and assembled.

Although, from a strictly technical standpoint, "paraffin" is not a "wax", nevertheless I have used the term "wax" herein and in the appended claims as a generic term which is intended to include paraffin and the like.

In general, it will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. A receptacle of the character described, comprising paper sheet material rolled and assembled into a substantially cup-shaped body adapted to accommodate liquid therein, a coating of wax on the inside and outside surfaces of said body, and a layer of caoutchouc beneath the wax coating on the inside surfaces.

2. A receptacle for liquid, comprising a substantially cup-shaped body formed of paper material rolled into a tube with a separate closure disc spun into engagement with one end of the tube, a continuous coating of caoutchouc on the inside surfaces of said body, and a continuous layer of wax over said caoutchouc coating and also over the outside surfaces of said body.

3. A receptacle of the character described, comprising paper sheet material formed into a substantially cup-shaped body adapted to accommodate liquid therein, a coating of wax on the inside surfaces of said body, and a layer of caoutchouc beneath said wax coating.

ALEXANDER FRIEDEN.